US008520586B1

(12) United States Patent
Husted et al.

(10) Patent No.: US 8,520,586 B1
(45) Date of Patent: Aug. 27, 2013

(54) DISCOVERY AND CONNECTION COEXISTENCE MECHANISM FOR WIRELESS DEVICES

(75) Inventors: Paul J. Husted, San Jose, CA (US); Praveen Dua, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 589 days.

(21) Appl. No.: 12/639,207

(22) Filed: Dec. 16, 2009

(51) Int. Cl.
*H04B 7/185* (2006.01)

(52) U.S. Cl.
USPC .......................................... 370/318; 455/522

(58) Field of Classification Search
None
See application file for complete search history.

(56) References Cited

U.S. PATENT DOCUMENTS

| | | | |
|---|---|---|---|
| 7,046,649 B2 | 5/2006 | Awater et al. | |
| 7,151,764 B1* | 12/2006 | Heinonen et al. | 370/338 |
| 7,460,543 B2 | 12/2008 | Malik et al. | |
| 7,568,034 B1 | 7/2009 | Dulitz et al. | |
| 7,814,224 B2 | 10/2010 | Maruyama et al. | |
| 2002/0136233 A1 | 9/2002 | Chen et al. | |
| 2004/0156367 A1 | 8/2004 | Albuquerque et al. | |
| 2004/0242258 A1 | 12/2004 | Kim | |
| 2005/0185651 A1 | 8/2005 | Rinne | |
| 2006/0030266 A1 | 2/2006 | Desai et al. | |
| 2006/0221825 A1 | 10/2006 | Okano | |
| 2006/0292986 A1 | 12/2006 | Bitran et al. | |
| 2007/0021066 A1 | 1/2007 | Dravida et al. | |
| 2007/0135162 A1 | 6/2007 | Banerjea et al. | |
| 2007/0165754 A1 | 7/2007 | Kiukkonen et al. | |
| 2007/0183338 A1* | 8/2007 | Singh et al. | 370/252 |
| 2007/0275746 A1 | 11/2007 | Bitran | |
| 2008/0095124 A1 | 4/2008 | Ramos et al. | |
| 2008/0102885 A1 | 5/2008 | Tu et al. | |
| 2008/0123682 A1 | 5/2008 | Yackoski et al. | |
| 2008/0130603 A1 | 6/2008 | Wentink et al. | |
| 2008/0240139 A1 | 10/2008 | Kodialam et al. | |
| 2008/0259846 A1 | 10/2008 | Gonikberg et al. | |
| 2009/0010152 A1 | 1/2009 | Ofek et al. | |
| 2009/0137206 A1 | 5/2009 | Sherman et al. | |
| 2009/0247217 A1 | 10/2009 | Hsu et al. | |
| 2009/0252095 A1* | 10/2009 | Lu et al. | 370/329 |
| 2009/0258607 A1* | 10/2009 | Beninghaus et al. | 455/77 |
| 2009/0298522 A1 | 12/2009 | Chaudhri et al. | |

(Continued)

OTHER PUBLICATIONS

Bluetooth, "Bluetooth Core Specification Version 3.0", vol. 2, part B: *Core System Package [Controller volume]* http://www.bluetooth.com/Bluetooth/Technology/Building/Specifications/ (Obtained from the Internet Nov. 4, 2009) Apr. 21, 2009 , pp. 59-206.

(Continued)

*Primary Examiner* — Yemane Mesfin
*Assistant Examiner* — Khoa Huynh
(74) *Attorney, Agent, or Firm* — DeLizio Gilliam, PLLC (57) ABSTRACT

Interference can impair communications of collocated wireless devices or wireless devices communicating in close proximity to each other. In implementations where the communications of one wireless device have a higher priority as compared to the communications of the other wireless device, the low priority communications should not impair or interfere with the high priority communications. Functionality can be implemented to control when the low priority wireless device transmits based on a current state (e.g., active/inactive) of the collocated high priority wireless device, a frequency separation between communication channels of the wireless devices, strengths of signals received by the wireless devices, etc. Transmit power of the low priority wireless device may be controlled so that the low priority communications do not impair the high priority communications.

25 Claims, 6 Drawing Sheets

(56) References Cited

U.S. PATENT DOCUMENTS

| | | |
|---|---|---|
| 2010/0284380 A1 | 11/2010 | Banerjee et al. |
| 2011/0009060 A1* | 1/2011 | Hsu et al. .................... 455/41.2 |
| 2011/0268024 A1 | 11/2011 | Jamp et al. |

OTHER PUBLICATIONS

"CSR Bluetooth and IEEE 802.11b Co-Existence Solution", *CSR BlueCore 2-External* Feb. 2003, 20 pages.

"CSR Co-Existence Scheme Definition", *BlueCore 3-External* Nov. 2003, 8 pages.

"How 802.11b/g WLAN and Bluetooth Can Play", *Philips* Sep. 2005, 5 pages.

"Three Wire Interface", *Infineon Technologies* Functional Design Document Oct. 4, 2004, 6 pages.

"Wi-Fi and Bluetooth—Interference Issues", *Hewlett Packard* Jan. 2002, 6 pages.

U.S. Appl. No. 12/846,427, filed Jul. 29, 2010, Jamp, Joe I.

U.S. Appl. No. 12/236,604, filed Sep. 24, 2008, Nam, Kyungwan et al.

U.S. Appl. No. 12/633,150, filed Dec. 8, 2009, Luthra, Manev.

U.S. Appl. No. 12/651,871, filed Jan. 4, 2010, Husted, Paul J.

Co-pending U.S. Appl. No. 12/620,270, filed Nov. 17, 2009, 54 pages.

Golmie, N.; Chevrollier, N.; Rebala, O.; , "Bluetooth and WLAN coexistence: challenges and solutions," Wireless Communications, IEEE, vol. 10, No. 6, pp. 22-29, Dec. 2003, doi: 10.1109/MWC.2003.1265849,URL: http://ieeexplore.ieee.org/stamp/stamp.jsp?tp=&arnumber=1265849&isnumber=28311.

"U.S. Appl. No. 12/236,604 Office Action", Jun. 29, 2011, 39 pages.

"U.S. Appl. No. 12/620,270 Office Action", Dec. 8, 2011, 8 pages.

"U.S. Appl. No. 12/633,150 Office Action", Jun. 19, 2012, 35 pages.

International Search Report and Written Opinion—PCT/US2011/045888—ISA/EPO—Dec. 13, 2011, 7 pages.

U.S. Appl. No. 12/846,427 Office Action, Oct. 10, 2012, 20 Pages.

\* cited by examiner

DISCOVERY AND CONNECTION COEXISTENCE MECHANISM FOR WIRELESS DEVICES

BACKGROUND

Embodiments of the inventive subject matter generally relate to the field of wireless communication and, more particularly, to a discovery and connection coexistence mechanism for wireless devices.

When wireless devices are in close proximity to each other, communication from one wireless device may interfere with communication from the other wireless device. For example, when Bluetooth® and wireless local area network (WLAN) devices operate in close proximity to each other, the radio protocol of one device can interfere with the radio protocol of the other device. The Bluetooth device can use adaptive frequency hopping (AFH) techniques to avoid frequencies on which a WLAN transmission is detected. Packet traffic arbitration (PTA) wires may also be used to provide dynamic information to the wireless devices to prevent the Bluetooth and WLAN devices from transmitting at the same time.

SUMMARY

Various embodiments are disclosed for a discovery and connection coexistence mechanism for wireless devices. In one embodiment, a first wireless network device of a first system receives a first RF signal comprising an inquiry message from an inquiring wireless network device of a second system. It is determined that a second wireless network device of the first system is in an active state. A signal strength of the first RF signal that comprises the inquiry message is determined. A communication frequency associated with the first wireless network device, a communication frequency associated with the second wireless network device, and a communication frequency separation between the first wireless network device and the second wireless network device are also determined. A response to the inquiry message is transmitted to the inquiring wireless network device based, at least in part, on the communication frequency separation between the first wireless network device and the second wireless network device, and the signal strength of the first RF signal.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to a coexistence interface for WLAN and Bluetooth devices, in other embodiments the coexistence interface may be implemented for other wireless standards and devices, e.g., WiMAX, ZigBee®, Wireless USB devices, etc. In other instances, well-known instruction instances, protocols, structures, and techniques have not been shown in detail in order not to obfuscate the description.

Interference between wireless radio devices (e.g., a Bluetooth device and a WLAN device) may be caused when the two wireless devices are collocated on the same system and/or are communicating (e.g., transmitting signals, receiving signals) in close proximity to each other. Such interference between the Bluetooth and the WLAN devices that are in close proximity to each other can result in performance degradation. When WLAN communications have a higher priority over Bluetooth communications, the Bluetooth communications should not impair or interfere with the WLAN communications. In some embodiments, a coexistence agent on the Bluetooth device can control when the Bluetooth device transmits based on a current state (e.g., active/inactive) of the collocated WLAN device. Also, in some implementations, the coexistence agent can control when the Bluetooth device transmits without any synchronization or exchange of operating information between the collocated Bluetooth and WLAN devices. Moreover, the coexistence agent can also control a transmit power used by the Bluetooth device and help ensure that the Bluetooth device communicates and/or responds to inquiries only if the Bluetooth communications do not interrupt the WLAN communications.

Figure 1:
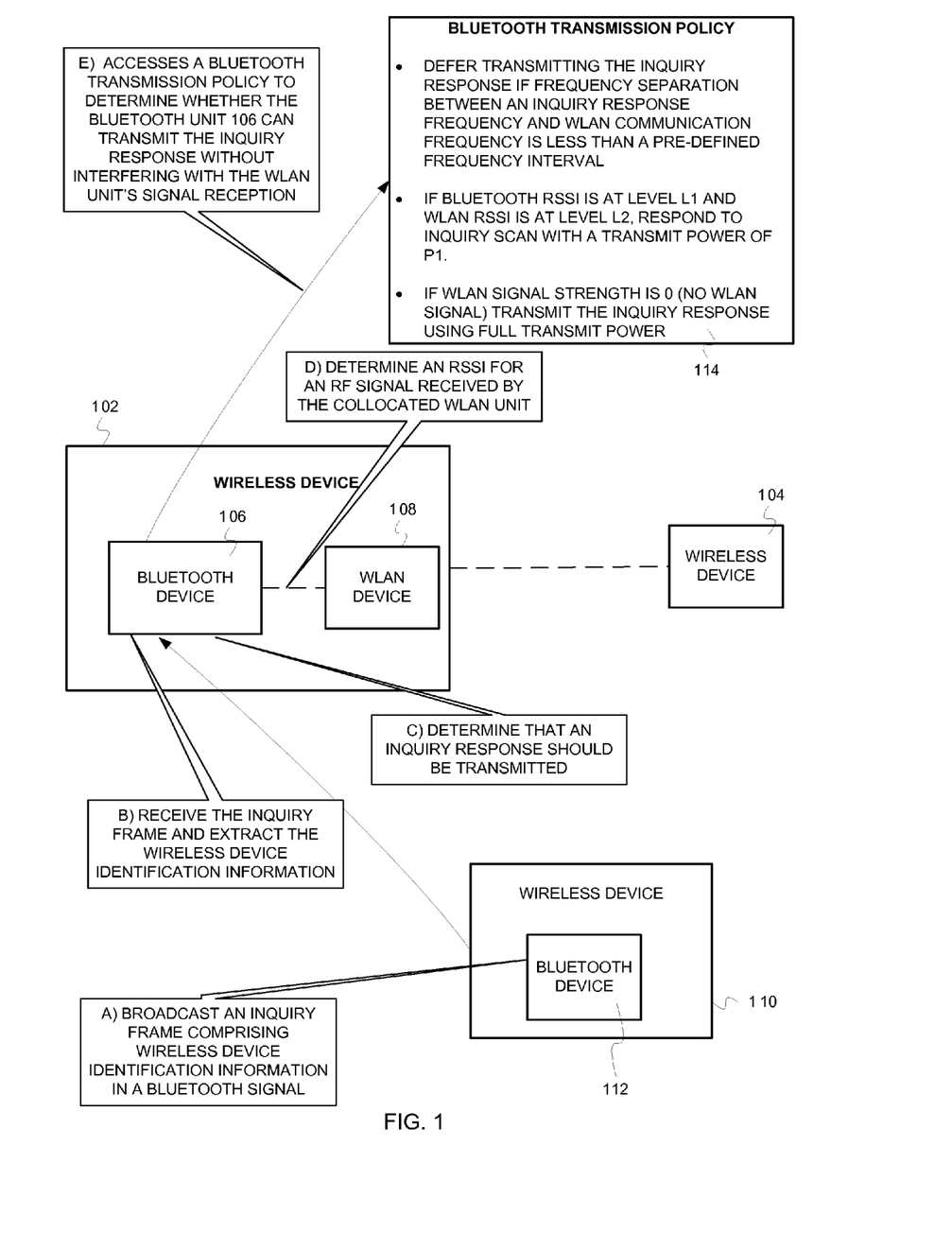
FIG. 1 is a block diagram illustrating example operations for enabling coexistence between Bluetooth and WLAN devices without interrupting WLAN communications.

FIG. 1 is a block diagram illustrating example operations for enabling coexistence between Bluetooth and WLAN devices without interrupting WLAN communications. FIG. 1 depicts a wireless device 102 comprising a Bluetooth device 106 and a WLAN device 108. In some implementations, the wireless device 102 may include communication systems such as a laptop, a netbook, a portable gaming console, a mobile phone, a personal digital assistant (PDA), or other communication systems comprising a Bluetooth device 106 and a WLAN device 108 in close proximity to each other (e.g., collocated in the same chip or circuit board). The Bluetooth device 106 and the WLAN device 108 can communicate via dedicated general-purpose input output (GPIO) lines, via a software interface, etc. The WLAN device 108 in the wireless device 102 also communicates with a WLAN device (not shown) in a wireless device 104 using a wireless communication channel. For example, the wireless devices 102 and 104 may be used to play a video game or to transfer other type of data. Wireless device 110 comprises a Bluetooth device 112. The Bluetooth device 112 is programmed to communicate with the Bluetooth device 106. In one implementation, the Bluetooth device with an active WLAN device (i.e., Bluetooth device 102) can be in scanning mode ("scanning Bluetooth device"), while the Bluetooth device 112 can be in inquiry mode ("inquiring Bluetooth device"). The following discussion describes how the Bluetooth devices 112 and 106 can communicate without impairing or interrupting communication between the WLAN devices of the wireless devices 102 and 104.

At stage A, the inquiring Bluetooth device 112 broadcasts an inquiry frame comprising wireless device identification information in a Bluetooth signal. The wireless device identification information can comprise a wireless device identifier such as a Medium Access Layer (MAC) identification number, a network identifier, and other information (e.g., information identifying applications running on the inquiring Bluetooth device 112, device and network capabilities of the inquiring Bluetooth device 112, information identifying a user of the inquiring Bluetooth device 112, a timestamp, etc.) to enable scanning devices (i.e., Bluetooth devices that receive the inquiry frame) to identify the inquiring Bluetooth device 112. In some implementations, the inquiring Bluetooth device 112 may perform an inquiry operation and transmit the inquiry frame if the wireless device 110 does not comprise a WLAN device or comprises a currently inactive WLAN device. In other words, the Bluetooth devices 106 and 112 may not transmit in inquiry mode (i.e., transmit the inquiry frame) if they comprise a collocated WLAN device that is active, so that Bluetooth communications do not interrupt the WLAN communications. In one example, such a scenario may be encountered in a multi-player gaming scenario, where WLAN communications are used to control game play between multiple players. In the multi-player gaming example, the Bluetooth communications from a collocated Bluetooth device may be controlled so as not to impair the WLAN communications and to ensure that the players' gaming experience is not affected.

At stage B, the scanning Bluetooth device 106 on the wireless device 102 receives the inquiry frame and extracts the wireless device identification information. In some implementations, along with extracting the wireless device identification information such as the MAC address, the network identifier, etc., the scanning Bluetooth device 106 also determines a received signal strength indicator (RSSI) for the Bluetooth signal transmitted by the inquiring Bluetooth device 112 ("Bluetooth RSSI"). The Bluetooth RSSI indicates the strength, when received, of the Bluetooth signal comprising the inquiry frame. Furthermore, the scanning Bluetooth device 106 determines a frequency on which the scanning Bluetooth device 106 can transmit a response to the inquiry frame ("inquiry response frequency").

At stage C, the scanning Bluetooth device 106 determines that a response to the inquiry frame ("inquiry response") should be transmitted. In some implementations, the scanning Bluetooth device 106 may compare the MAC address of the inquiring Bluetooth device 112 with a list of MAC addresses of Bluetooth devices with which the scanning Bluetooth device 106 is programmed to communicate. For example, a user of the scanning Bluetooth device 106 may program the list of MAC addresses. The scanning Bluetooth device 106 may transmit the inquiry response only if the MAC address of the inquiring Bluetooth device 112 is on the list of MAC addresses. In other words, in some implementations, the scanning Bluetooth device 106 may not respond to the inquiry frame if the scanning Bluetooth device 106 does not find a match for the inquiring Bluetooth device's MAC address. Also, in some implementations, the scanning Bluetooth device 106 may not respond to the inquiry frame if the scanning Bluetooth device 106 and the inquiring Bluetooth device 112 have already exchanged information and/or the scanning Bluetooth device 106 has no information to transmit to the inquiring Bluetooth device 112.

At stage D, the scanning Bluetooth device 106 determines an RSSI for an RF signal received by the collocated WLAN device 108 ("WLAN RSSI"). In one implementation, the WLAN device 108 and the scanning Bluetooth device 106 may be physically connected (e.g., using connecting wires) and the WLAN device 108 may communicate the WLAN RSSI to the scanning Bluetooth device 106 via the connecting wires. In another implementation, the WLAN device 108 can communicate the WLAN RSSI to the scanning Bluetooth device 106 via a software module on the wireless device 102 (e.g., a coexistence interface). In another implementation, the WLAN RSSI may be determined as one of an average RSSI of frames received by the collocated WLAN device 108 over a pre-defined time interval, an average RSSI of a pre-defined number of previously received frames, a minimum RSSI of a pre-defined number of previously received frames, etc. as will be described with reference to FIG. 3.

At stage E, the scanning Bluetooth device 106 accesses a Bluetooth transmission policy 114 to determine whether the scanning Bluetooth device 106 can transmit the inquiry response without interfering with the collocated WLAN device's 108 signal reception. For example, as indicated in the Bluetooth transmission policy 114, the scanning Bluetooth device 106 may defer transmitting the inquiry response if the scanning Bluetooth device 106 determines that frequency separation between the inquiry response frequency and a WLAN communication frequency is less than a pre-determined frequency interval. The Bluetooth transmission policy 114 may also indicate a power level at which the Bluetooth scanning device 106 may transmit the inquiry response based on the WLAN RSSI, the Bluetooth RSSI, and the frequency separation between the inquiry response frequency and the WLAN communication frequency. The Bluetooth transmission policy 114 may also indicate that if the WLAN device 108 is inactive (e.g., the WLAN device is in sleep mode), the scanning Bluetooth device 106 may transmit the inquiry response to the inquiring Bluetooth device 112. Additionally, the Bluetooth device 104 may also enter the inquiry mode and transmit inquiry frames at full power or exchange information with other connected Bluetooth devices while the WLAN device 108 is inactive. The scanning Bluetooth device 106 may cease all transmissions (or transmit at an acceptable power level to avoid interference with the WLAN signal as described with reference to FIG. 3) when the WLAN device 108 becomes active (e.g., awakes from the sleep mode).

Figure 2:
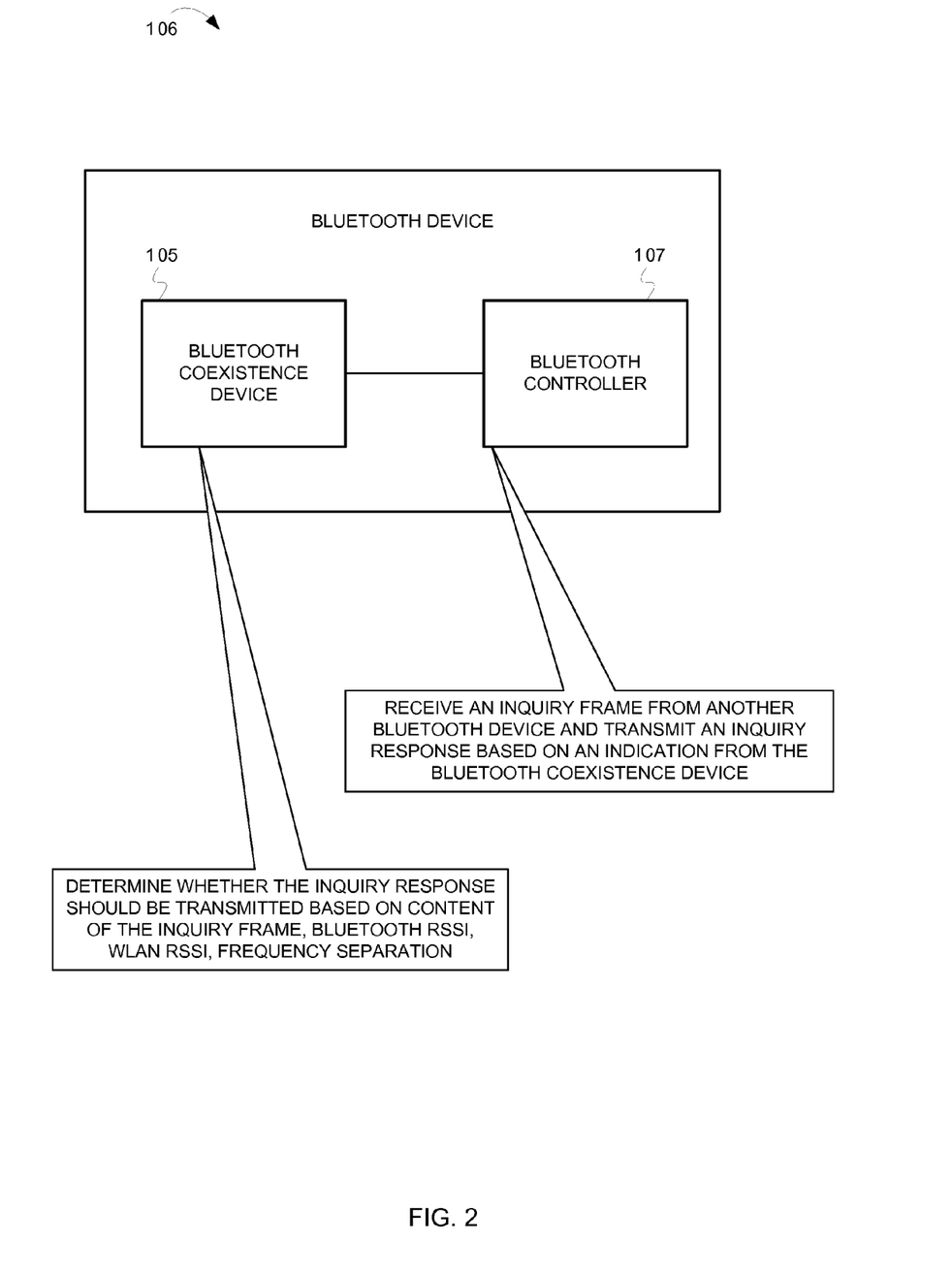
FIG. 2 further illustrates one embodiment of the Bluetooth device.

FIG. 2 further illustrates one embodiment of the Bluetooth device 106. The Bluetooth device 106 comprises a Bluetooth coexistence device 105 and a Bluetooth controller 107. The Bluetooth coexistence device 105 is coupled to the Bluetooth controller 107. In some implementations, the Bluetooth controller 107 can broadcast an inquiry frame comprising the wireless device identification information in a Bluetooth signal. The Bluetooth controller 107 can also receive an inquiry frame from another Bluetooth device (e.g., the inquiring Bluetooth device 112 of FIG. 1). The Bluetooth controller 107 can transmit a Bluetooth signal based on instructions received from the Bluetooth coexistence device 105. On receiving the inquiry frame from the Bluetooth device 112, the Bluetooth controller 107 can notify the Bluetooth coexistence device 105. The Bluetooth coexistence device 105 can determine (based on content of the inquiry frame) whether communication with the Bluetooth device 112 should be established. The Bluetooth coexistence device 105 can also determine the WLAN RSSI from the collocated WLAN device 108, a power level at which the inquiry response should be transmitted, and determine whether/when the inquiry response should be transmitted based on the Bluetooth transmission policy 114. Operations for enabling coexistence between the Bluetooth device 102 and the WLAN device 108 without interrupting WLAN communications will be further described with reference to flow diagrams of FIGS. 3-5.

Figure 3:
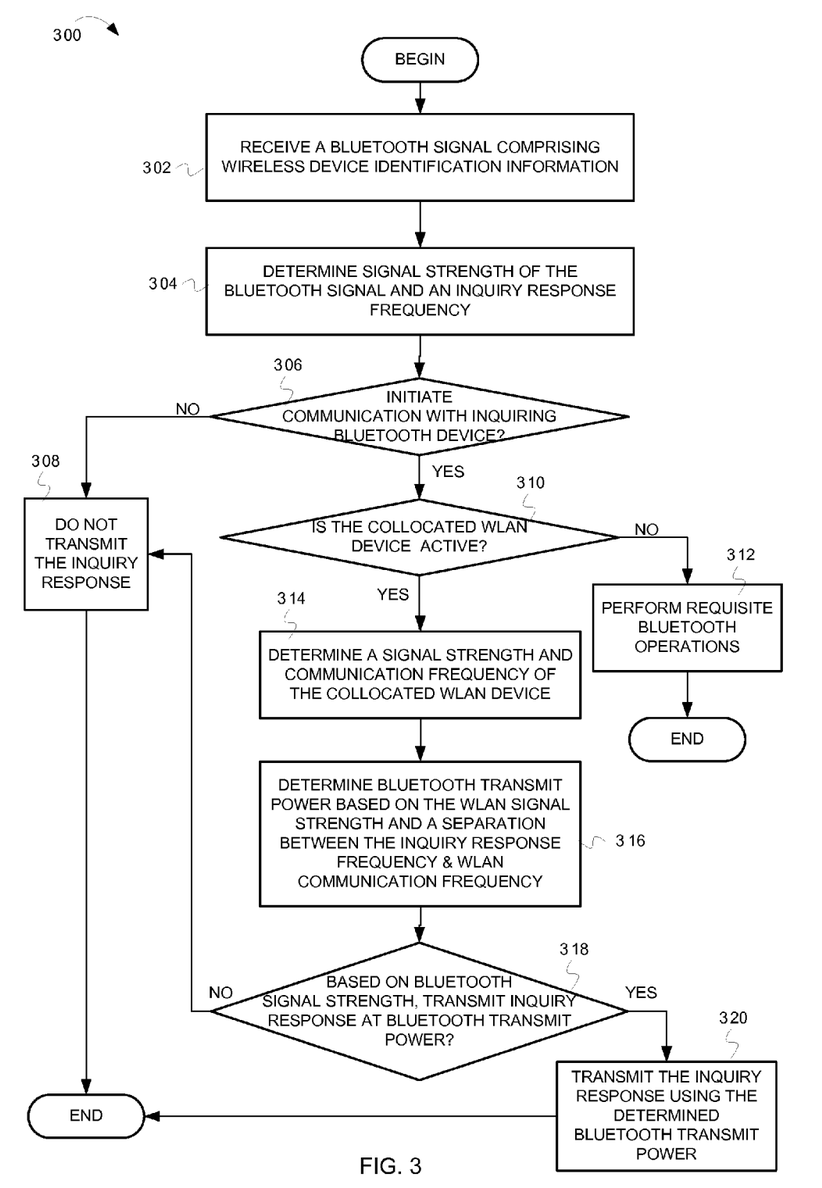
FIG. 3 is a flow diagram illustrating example Bluetooth discovery operations for collocated Bluetooth and WLAN devices.

FIG. 3 is a flow diagram illustrating example Bluetooth discovery operations for collocated Bluetooth and WLAN devices. Flow 300 begins at block 302.

At block 302, a Bluetooth signal comprising wireless device identification information is received from an inquiring Bluetooth device. For example, the Bluetooth controller 107 of the scanning Bluetooth device 106 of FIG. 2 may receive the wireless device identification information from the inquiring Bluetooth device 112 (shown in FIG. 1. The inquiring Bluetooth device 112 may transmit the wireless device identification information as part of an inquiry frame or an extended inquiry frame. The wireless device identification information can comprise a medium access layer (MAC) identification number of a WLAN device collocated with the inquiring Bluetooth device 112, a timestamp indicating a date and time at which the inquiry frame was transmitted, a network identifier, and other device identifiers to enable the scanning Bluetooth device 106 to identify the inquiring Bluetooth device 112. For example, the wireless device identification information may comprise data about applications currently being used on the inquiring Bluetooth device 112. As another example, wireless device identification information may comprise a content timestamp indicating a date and time that a profile page (e.g., of an owner of the inquiring Bluetooth device) was last updated. The wireless device identification information may also comprise information identifying the owner (e.g., user identifier) of the inquiring Bluetooth device 112. The wireless device identification information can also comprise information about current network-capable applications and capabilities of the inquiring Bluetooth device 112 (e.g., data rate, graphics capabilities, etc). The flow continues at block 304.

At block 304, signal strength of the received Bluetooth signal and a frequency on which the scanning Bluetooth device should respond to the inquiry frame ("inquiry response frequency") is determined. For example, the Bluetooth coexistence device 105 in the scanning Bluetooth device 106 may calculate a received signal strength indicator (RSSI) of the received Bluetooth signal ("Bluetooth RSSI") as a measurement of the power present in the received Bluetooth signal. The Bluetooth coexistence device 105 can also determine the inquiry response frequency based on knowledge of a pre-determined frequency-hopping pattern typically used by Bluetooth devices in inquiry scan mode. The flow continues at block 306.

At block 306, it is determined whether communication with the inquiring Bluetooth device should be initiated. For example, the Bluetooth coexistence device 105 in the scanning Bluetooth device 106 may determine whether communication with the inquiring Bluetooth device 112 should be initiated. The Bluetooth coexistence device 105 may compare the MAC address of the inquiring Bluetooth device 112 with a list of MAC addresses of Bluetooth devices with which the scanning Bluetooth device 106 is programmed to communicate. Alternately, a list of suitable identifiers may be accessed and compared against the corresponding identifier of the inquiring Bluetooth device 112 to determine whether the communication should be initiated. Communication with the inquiring Bluetooth device 112 may not be initiated (e.g., by not transmitting an inquiry response) if the Bluetooth coexistence device 105 determines that a match for the inquiring Bluetooth device's identifier cannot be identified. Also, communication with the inquiring Bluetooth device 112 may not be initiated if the Bluetooth coexistence device 105 determines that that information between the scanning and the inquiring Bluetooth devices has already been exchanged and/or and the scanning Bluetooth device 106 has no information to transmit to the inquiring Bluetooth device 112. For example, the Bluetooth coexistence device 105 may determine, based on the content timestamp, that the user profile page was received in a previous communication. If it is determined that communication with the inquiring Bluetooth device should be initiated, the flow continues at block 310. Otherwise, the flow continues at block 308.

At block 310, it is determined whether a WLAN device collocated with the scanning Bluetooth device ("collocated WLAN device") is active (e.g., receiving RF signals, transmitting RF signals, etc). In one implementation, the Bluetooth coexistence device 105 may query (e.g., via hardware, software, etc.) the collocated WLAN device 108 (shown in FIG. 1) to determine whether the collocated WLAN device 108 is receiving the RF signals. In another implementation, the collocated WLAN device 108 may notify the Bluetooth coexistence device 105 before the collocated WLAN device 108 enters sleep mode (i.e., an inactive state where the collocated WLAN device neither transmits nor receives RF signals). In some implementations, the collocated WLAN device 108 may provide the Bluetooth coexistence device 105 with information about how often the collocated WLAN device 108 will enter the sleep mode, how long the collocated WLAN device will remain in the sleep mode, an interval of time for which the collocated WLAN device will remain in an active state, etc. If it is determined that the WLAN device collocated with the scanning Bluetooth device is active, the flow continues at block 314. Otherwise, the flow continues at block 312.

At block 312, requisite Bluetooth operations are performed. For example, the inquiry response may be transmitted (e.g., by the scanning Bluetooth device 106) using a maximum permissible transmit power. The inquiry response may comprise the scanning Bluetooth device's MAC address, application identifiers, and other network identifiers. In some implementations, the scanning Bluetooth device may enter the inquiry mode and broadcast its availability to other Bluetooth devices, transmit Bluetooth signals to connected Bluetooth devices, etc. It should be noted that there may be no restrictions on the transmit/receive operations of the scanning Bluetooth device 106 when the collocated WLAN device 108 is inactive. Also, the transmit power used by the scanning Bluetooth device 106 may be limited only by the maximum permissible power limits (e.g., as defined by the FCC). From block 312, the flow ends.

At block 314, a signal strength and a communication frequency of the collocated WLAN device is determined. For example, the Bluetooth coexistence device 105 can receive an RSSI for an RF signal received by the collocated WLAN device 108 ("WLAN RSSI"). In one implementation, the WLAN RSSI may be a current RSSI of a currently received RF signal. In another implementation, the WLAN RSSI may be an average RSSI of frames received by the collocated WLAN device 108 over a pre-defined time interval. In another implementation, the WLAN RSSI may be an average RSSI of a pre-defined number of previously received frames. For example, the average RSSI may be calculated based on RSSI of ten previously received frames. In another implementation, the WLAN RSSI may be a minimum RSSI of a pre-defined number of previously received frames. For example, the RSSI of a hundred frames may be compared and the smallest RSSI value may be reported as the WLAN RSSI. In one implementation, the Bluetooth coexistence device 105 may receive the WLAN RSSI or other suitable indication of RF signal strength from the WLAN device via PTA wires, a software interface, etc. Additionally, the WLAN communication frequency may also be determined. The collocated WLAN device may transmit the WLAN communication frequency to the Bluetooth coexistence device 105. For example, a range of frequencies on which the collocated WLAN device receives the RF signals may be transmitted to the Bluetooth coexistence device 105. The flow continues at block 316.

At block 316, a Bluetooth transmit power is determined based, at least in part, on the WLAN signal strength and a frequency separation between the inquiry response frequency and the WLAN communication frequency. The Bluetooth transmit power for the inquiry response may be determined as a function of the frequency separation and the WLAN RSSI. In one implementation, the Bluetooth coexistence device 105 may access a look-up table to determine a maximum Bluetooth transmit power for given values of the frequency separation and the WLAN RSSI. For example, for a given WLAN RSSI, the Bluetooth device may be allowed to transmit with 1) a transmit power of −20 dBm when the frequency separation is at least 15 MHz, 2) a transmit power of −15 dBm if the frequency separation is 20 MHz, 3) with a transmit power of −10 dBm if the frequency separations if 25 MHz, and 4) with a transmit power of −5 dBm if the frequency separation is greater than or equal to 30 MHz. In another implementation, the Bluetooth coexistence device 105 may calculate the Bluetooth transmit power by inputting the frequency separation and the WLAN RSSI as input values into pre-defined equations. For example, with inputs of a 30 MHz frequency separation, a −50 dBm WLAN RSSI, and a 30 dB requisite power separation between the Bluetooth transmit power and the WLAN RSSI, it may be calculated that the Bluetooth transmit power should not exceed −20 dBm.

In some implementations, the Bluetooth coexistence device 105 may access the look-up table or determine the Bluetooth transmit power only if the frequency separation is greater than a pre-defined frequency separation threshold. For example, if the frequency separation is less than the pre-defined frequency separation threshold (i.e., the frequency separation is too small), the Bluetooth device may not transmit the inquiry response. In some implementations, the frequency separation threshold may vary depending on the WLAN RSSI. For instance, the frequency separation threshold may be 5 MHz if the WLAN RSSI is −10 dBm, 10 MHz if the WLAN RSSI is −15 dBm, etc. In one example, if the WLAN RSSI is −15 dBm and the frequency separation is 5 MHz, the Bluetooth coexistence device 105 may determine that the frequency separation is less than the frequency separation threshold, and may therefore not determine the Bluetooth transmit power and not send an inquiry response.

The Bluetooth transmit power for different combinations of the frequency separation and WLAN RSSI can be determined and programmed based on simulations, calculations, analysis of historical data, etc. Other factors can also be taken into consideration, such as power regulations defined by power regulatory agencies (e.g., Federal Communications Commission (FCC), power amplification capabilities of the Bluetooth device 106, knowledge of a maximum tolerable power separation between the Bluetooth RSSI and the WLAN RSSI, etc. The Bluetooth transmit power may be determined and programmed such that the inquiry response, if transmitted at the Bluetooth transmit power, does not affect transmissions of the WLAN device. The flow continues at block 318.

At block 318, it is determined, based on the Bluetooth signal strength, whether the inquiry response should be transmitted at the Bluetooth transmit power. For example, the Bluetooth coexistence device 105 may determine whether the inquiry response should be transmitted at the Bluetooth transmit power. In one implementation, the Bluetooth coexistence device 105 may compare the Bluetooth RSSI (determined at block 304) with the Bluetooth transmit power (determined at block 316) to determine whether the inquiry response can be transmitted at the Bluetooth transmit power. The Bluetooth coexistence device 105 may determine whether the Bluetooth transmit power is sufficient for the inquiring Bluetooth device 112 to receive the inquiry response. In one implementation, a table comprising a set of Bluetooth RSSI values and corresponding minimum transmit power can be accessed to determine whether the inquiry response (if transmitted using the Bluetooth transmit power) will be received without distortion or other impairments by the inquiring Bluetooth device 112.

If the Bluetooth transmit power is too low for the inquiry response to be received by the inquiring Bluetooth device 112 (e.g., if the Bluetooth transmit power is less than the minimum transmit power), the scanning Bluetooth device 106 may identify the next Bluetooth inquiry frequency, temporarily defer transmission, and/or transmit the inquiry response when the collocated WLAN device 108 becomes inactive. For example, if the Bluetooth RSSI is very low and the Bluetooth transmit power is very low (e.g., due to a low WLAN RSSI, small frequency separation, etc.), the Bluetooth coexistence device 105 may determine that the Bluetooth transmit power is too small to transmit the inquiry frame to a distant Bluetooth inquiring device 112. Based on the Bluetooth RSSI, the Bluetooth coexistence device 105 may calculate the probability of the inquiry response being corrupted during transmission if the inquiry response is transmitted at the Bluetooth transmit power, the probability of the inquiry response being successfully received by the inquiring Bluetooth device 112, etc.

Additionally, the Bluetooth coexistence device 105 may also vary the Bluetooth transmit power based on the Bluetooth RSSI. For example, if the Bluetooth RSSI is very large (e.g., indicating the scanning and the inquiring Bluetooth devices are in close proximity to each other) and the Bluetooth transmit power is large, the Bluetooth coexistence device 105 may decrease the Bluetooth transmit power accordingly. If it is determined that the inquiry response should be transmitted with the Bluetooth transmit power, the flow continues at block 320. Otherwise, the flow continues at block 308.

At block 320, the inquiry response is transmitted using the Bluetooth transmit power. For example, the Bluetooth coexistence device 105 may direct the Bluetooth controller 107 to transmit the inquiry response to the inquiring Bluetooth device 112 using the Bluetooth transmit power determined above with reference to block 316. The Bluetooth coexistence device 105 can direct the Bluetooth controller 107 to transmit the inquiry response on determining that the Bluetooth transmit power is at an acceptable power level given the frequency separation, the WLAN RSSI, and the Bluetooth RSSI. The inquiry response can comprise the scanning Bluetooth device's MAC address, timestamps, and device identifiers. The Bluetooth controller 107 can transmit the inquiry response based on stored information about the inquiring Bluetooth device (e.g., the MAC address, other device identifiers, the inquiry response frequency, etc.). From block 320, the flow ends At block 308, the inquiry response is not transmitted to the inquiring Bluetooth device. The flow 300 moves from block 306 to block 308 if it is determined that communication with the inquiring Bluetooth device 112 should not be initiated. The Bluetooth coexistence device 105 can direct the Bluetooth controller 107 to not transmit the inquiry response if the scanning Bluetooth device 106 is not programmed to communicate with the inquiring Bluetooth device 112. The flow 300 also moves from block 318 to block 308 if it is determined, based on the Bluetooth RSSI, that the inquiry response cannot be successfully transmitted at the Bluetooth transmit power. As described with reference to block 316, the Bluetooth transmit power may be calculated based on the WLAN RSSI and the frequency separation between the inquiry response frequency and the WLAN communication frequency. The Bluetooth coexistence device 105 can direct the Bluetooth controller 107 to not respond to the inquiry frame if transmitting on the inquiry response frequency will impair the collocated WLAN device's reception of RF signals and/or the WLAN RSSI is less than a threshold level. The Bluetooth coexistence device 105 can also direct the Bluetooth controller 107 to not respond to the inquiry frame if it is determined that both the Bluetooth RSSI and the WLAN RSSI are low. In some implementations, the scanning Bluetooth device 106 may choose to temporarily ignore the inquiring Bluetooth device 112. The Bluetooth coexistence device 105 may direct the Bluetooth controller 107 to temporarily defer transmitting the inquiry response. The Bluetooth coexistence device 105 may record information about the inquiring Bluetooth device such as a MAC address or other device identifier, the inquiry response frequency, etc. In other implementations, the Bluetooth coexistence device 105 may direct the Bluetooth controller 107 to defer transmitting the inquiry response if the WLAN RSSI is lower than the threshold level. The WLAN RSSI threshold may be determined based on a WLAN data rate, the Bluetooth RSSI, etc. From block 308, the flow ends.

It should be noted that in some implementations, after performing operations in response to receiving the inquiry frame, (e.g., transmitting the response at the Bluetooth transmit power, preventing transmission of the inquiry response, temporarily deferring transmission of the inquiry response, etc.) the scanning Bluetooth device 106 can enter the scanning mode and continue scanning for inquiry/page frames from other Bluetooth devices and repeat the process shown in FIG. 3.

Figure 4:
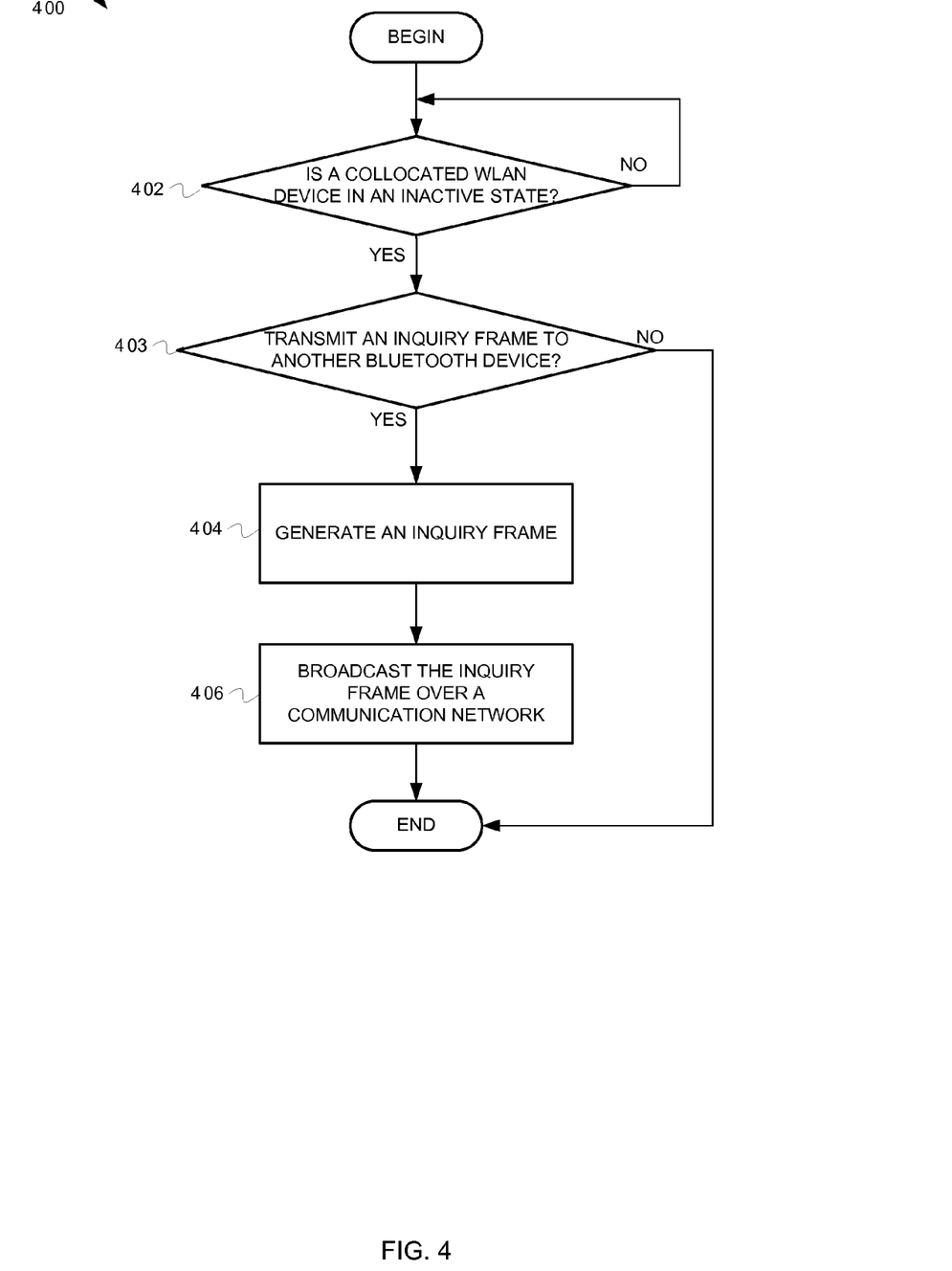
FIG. 4 is a flow diagram illustrating example operations for a Bluetooth device, with a collocated WLAN device, in inquiry mode.

FIG. 4 is a flow diagram illustrating example operations for a Bluetooth device, with a collocated WLAN device, in inquiry mode. Flow 400 begins at block 402.

At block 402, it is determined whether the collocated WLAN device is in an inactive state. For example, the Bluetooth coexistence device 105 in the scanning Bluetooth device 106 of FIG. 2 may determine whether the WLAN device 108 of FIG. 1 is in the inactive state. In one implementation, the Bluetooth coexistence device 105 may determine that the collocated WLAN device 108 is inactive in response to querying the collocated WLAN device 108. In another implementation, the collocated WLAN device 108 may notify the Bluetooth coexistence device 105 before the collocated WLAN device 108 enters the inactive state (e.g., a low power state, sleep mode, etc). In some implementations, the collocated WLAN device 108 may transmit information such as how often the collocated WLAN device 108 will enter the sleep mode, how long the collocated WLAN device 108 will remain in the sleep mode, an interval of time for which the collocated WLAN device 108 will remain in an active state, etc. to the Bluetooth coexistence device 105. The Bluetooth coexistence device 105 may calculate a schedule to determine when the collocated WLAN device 108 will be in an inactive/active state based on the information. If it is determined that the collocated WLAN device is in the inactive state, the flow continues at block 403. Otherwise, the flow loops back to block 402. It should be noted that the scanning Bluetooth device 106 might remain in scanning mode, receive inquiry/page frames from other Bluetooth devices, and transmit in accordance with operations described with reference to FIG. 3 when the collocated WLAN device is an active state.

At block 403, it is determined whether an inquiry frame should be transmitted. For example, the Bluetooth coexistence device 105 may determine whether the inquiry frame should be transmitted. The inquiry frame may be transmitted if the Bluetooth coexistence device 105 determines that communication should be established between the Bluetooth device 106 and another Bluetooth device (e.g., the Bluetooth device 112). If it is determined that the inquiry frame should be transmitted, the flow continues at block 404. Otherwise, the flow ends without the Bluetooth device 106 generating and transmitting the inquiry frame. The Bluetooth device 106 may resume scanning for inquiry frame from other Bluetooth devices or may enter an inactive state.

At block 404, the inquiry frame is generated. The inquiry frame can comprise a MAC address of the Bluetooth device, a network identifier, and other such information identifying the Bluetooth device 106 that generated the inquiry frame. The inquiry frame may also comprise a timestamp indicating a date/time at which the inquiry frame was generated. The inquiry frame may also comprise a content timestamp indicating date/time at which content to be transmitted (e.g., user profile information) was updated. The inquiry frame may be in a format described by a Bluetooth extended inquiry packet format or any suitable format. The flow continues at block 406.

At block 406, the inquiry frame is broadcasted over a communication network. The Bluetooth coexistence device 105 may direct the Bluetooth controller 107 to transmit the inquiry frame. Scanning Bluetooth devices may receive the inquiry frame and determine whether communication should be initiated. The scanning Bluetooth devices may also calculate a power at which a response to the inquiry frame should be transmitted. The scanning Bluetooth devices may transmit the response to the inquiry frame or defer transmission of the response based on a state (e.g., active/inactive) of collocated WLAN devices, etc. Operations for determining how and when the scanning Bluetooth devices may respond to the inquiry frame are described with reference to FIG. 3. From block 406, the flow ends.

Figure 5:
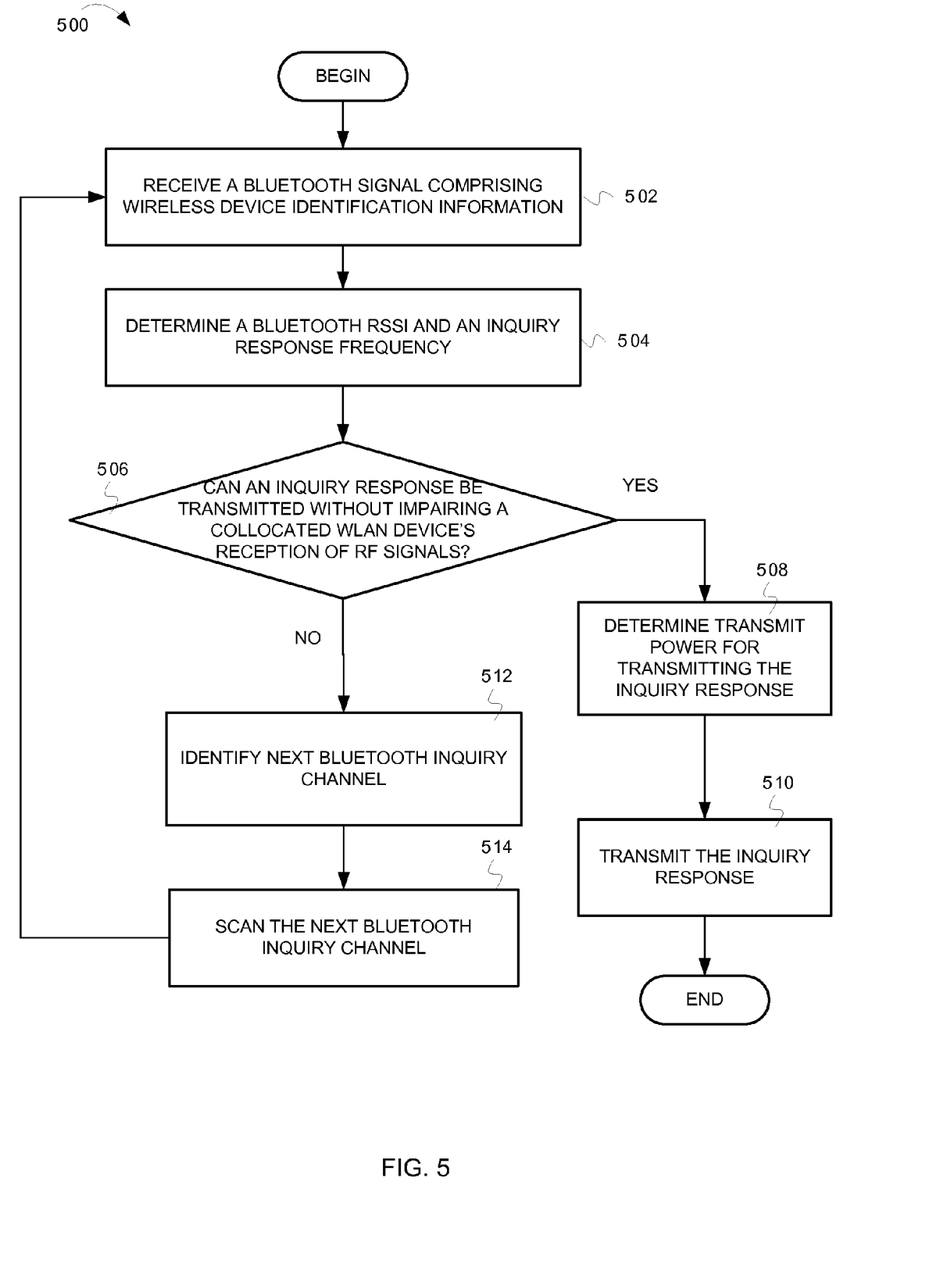
FIG. 5 is a flow diagram illustrating example operations for rescheduling a Bluetooth device's response to an inquiry frame.

FIG. 5 is a flow diagram illustrating example operations for rescheduling a Bluetooth device's response to an inquiry frame. Flow 500 begins at block 502.

At block 502, a Bluetooth signal comprising wireless device identification information is received from an inquiring Bluetooth device. For example, the Bluetooth controller 107 in the scanning Bluetooth device 106 of FIG. 2 may receive the wireless device identification information from the inquiring Bluetooth device 112 (shown in FIG. 1). The inquiring Bluetooth device 112 may transmit the wireless device identification information as part of an extended inquiry frame. The wireless device identification information can comprise a MAC identification number, a network identifier, timestamps, and other information to enable the scanning Bluetooth device 106 to identify the inquiring Bluetooth device 112. The flow continues at block 504.

At block 504, a Bluetooth RSSI for the received Bluetooth signal and an inquiry response frequency is determined. In one implementation, the Bluetooth coexistence device 105 may determine the Bluetooth RSSI from the received Bluetooth signal. In another implementation, the Bluetooth controller 107 may determine the Bluetooth RSSI and indicate the Bluetooth RSSI to the Bluetooth coexistence device 105.

The Bluetooth RSSI indicates the strength of the received Bluetooth signal. The inquiry response frequency can be determined based on knowledge of a pre-determined frequency-hopping pattern typically used by Bluetooth devices in inquiry scan mode. Alternately, the wireless device identification information may indicate the inquiry response frequency. The flow continues at block 506.

At block 506, it is determined whether an inquiry response can be transmitted without impairing a collocated WLAN device's reception of RF signals. In one implementation, the Bluetooth coexistence device 105 may perform one or more checks to determine whether the inquiry response can be transmitted without impairing the collocated WLAN device's reception of the RF signals. For example, the Bluetooth coexistence device 105 may determine whether there is a sufficient frequency separation between the inquiry response frequency and a WLAN communication frequency. FIG. 3 provides a more detailed description of operations to determine whether the scanning Bluetooth device 106 can transmit the inquiry response without affecting the collocated WLAN device's reception of the RF signals. If it is determined that the inquiry response can be transmitted without impairing the collocated WLAN device's reception of the RF signals, the flow continues at block 508. Otherwise, the flow continues at block 512.

At block 512, a next Bluetooth inquiry channel is identified. In inquiry mode, Bluetooth devices typically hop over a subset of the seventy-nine 1 MHz Bluetooth channels to transmit inquiry frames. Also, the corresponding Bluetooth channels for transmitting the inquiry response may also be pre-determined. For example, the order in which the Bluetooth channels are used for inquiry frame transmission and inquiry response may be hardcoded into the scanning Bluetooth device. The flow continues at block 514.

At block 514, the next Bluetooth inquiry channel is scanned. The Bluetooth coexistence device 105 may direct the Bluetooth controller 107 to wait for the inquiring Bluetooth device 112 to hop to the next Bluetooth inquiry channel and transmit the inquiry frame. The flow loops back to block 502, where the Bluetooth controller 107 receives the inquiry frame from the inquiring Bluetooth device 112 and the Bluetooth coexistence device 105 determines the Bluetooth RSSI, and whether the inquiry response frequency for the Bluetooth inquiry channel (identified at block 512) is conducive for transmitting the inquiry response.

At block 508, a transmit power for transmitting the inquiry response is determined. As described with reference to FIG. 3, the Bluetooth coexistence device 105 can determine the transmit power based on one or more of the WLAN RSSI, the Bluetooth RSSI, the frequency separation between the inquiry response frequency and the WLAN communication frequency, and a requisite power separation between the Bluetooth transmit power and the WLAN RSSI. The flow continues at block 510.

At block 510, the inquiry response is transmitted. In one implementation, the Bluetooth coexistence device 105 can direct the Bluetooth controller 107 to transmit the inquiry response. The inquiry response may comprise the scanning Bluetooth device's MAC address, timestamps, and other information indentifying the scanning Bluetooth device. From block 510, the flow ends.

It should be understood that the depicted flow diagrams (FIGS. 3-5) are examples meant to aid in understanding embodiments and should not be used to limit embodiments or limit scope of the claims. Embodiments may perform additional operations, fewer operations, operations in a different order, operations in parallel, and some operations differently. For instance in addition to transmitting the inquiry response, other data packets may also be exchanged between the inquiring and the scanning Bluetooth devices. Communication between the inquiring and the scanning Bluetooth devices may be enabled in accordance with Bluetooth communication protocols. Also, although FIGS. 3-5 describe operations for determining when the scanning Bluetooth device can transmit the inquiry response, the above-described operations may also be implemented after a connection between the inquiring and the scanning Bluetooth devices has been established. In addition to implementing adaptive frequency-hopping techniques, the operations for enabling coexistence between the collocated WLAN and Bluetooth devices as described with reference to FIG. 3 may be implemented to restrict Bluetooth communications that may impair the WLAN communications and to ensure that the performance of the WLAN device is not compromised.

Also, in FIG. 3, instead of temporarily ignoring the inquiring Bluetooth device if the frequency separation between the inquiry response frequency and the WLAN communication frequency is small and/or the Bluetooth RSSI and the WLAN RSSI are low, the scanning Bluetooth device may hop to the next Bluetooth inquiry channel, wait for the inquiring Bluetooth device to transmit the inquiry frame and determine whether the inquiry response frequency for the next inquiry channel is conducive to transmitting the inquiry response (as described in FIG. 5).

In some implementations, instead of successively scanning each Bluetooth hopping frequency to locate a frequency conducive for transmitting the inquiry response (as described in FIG. 4), the scanning Bluetooth device may wait until the inquiring Bluetooth device transmits the inquiry frame on a next cycle. The scanning Bluetooth device may determine that the WLAN device is scheduled to enter a sleep mode, that the WLAN device's signal reception will be complete before the next cycle, etc. In some implementations, the scanning Bluetooth device may wait until the WLAN device enters the sleep mode and use the inquiring Bluetooth device's MAC address/other identifiers to transmit a page frame.

In FIG. 4, in addition to broadcasting the inquiry frame, the Bluetooth device may also initiate connections with other Bluetooth devices, exchange Bluetooth signals with connected Bluetooth devices, enter scanning mode and receive inquiry frames from Bluetooth devices, etc. While the collocated WLAN device is inactive, the Bluetooth device may transmit at a maximum permissible power. The maximum permissible power may be determined by FCC transmit power regulations. Alternately, if possible, the Bluetooth device may transmit at a low transmit power even when the WLAN device is inactive in an attempt to conserve power. In some implementations, the low transmit power may be determined based on the Bluetooth RSSI. The Bluetooth device may cease all transmissions and remain exclusively in receive mode when the collocated WLAN device becomes active.

Also, in some implementations, the inquiry response may be transmitted using a maximum Bluetooth transmit power (e.g., as defined by the FCC transmit power regulations) on determining that the WLAN RSSI is much greater than is required for a current WLAN data rate and/or the frequency separation between the inquiry response frequency and the WLAN communication frequency is greater than a pre-defined interval. In other implementations, the Bluetooth coexistence device 105 may not permit transmission of the inquiry response on detecting that the collocated WLAN device is active irrespective of the frequency separation, the Bluetooth RSSI, and the WLAN RSSI. In other implementations, the Bluetooth coexistence device 105 may not permit transmission of the inquiry response using the maximum Bluetooth transmit power unless the collocated WLAN device is inactive.

Lastly, it should also be noted that in some implementations, the operations described with reference to FIGS. 1-5 might be performed to avoid interference between Bluetooth signal transmission and the WLAN signal reception. The Bluetooth signal transmission may not be restricted during WLAN signal transmission. Collision between Bluetooth and WLAN signal transmissions may be avoided by noting that the WLAN device senses a communication medium before initiating transmission. The Bluetooth device may comprise functionality to abort the Bluetooth signal transmission if it is determined that the WLAN device will be receiving RF signals. In some implementations, the Bluetooth device may also comprise functionality to predict a transmission/reception schedule for the WLAN device so as to avoid transmitting Bluetooth signals during WLAN signal communication. In some implementations, electronic devices with collocated WLAN and Bluetooth devices may also comprise antenna(s) allow one or more of parallel Bluetooth/WLAN signal transmission, parallel Bluetooth/WLAN signal reception, etc. In some implementations, before initiating Bluetooth signal transmission, the Bluetooth device may also determine how much time is available for Bluetooth signal transmission and whether the Bluetooth signal transmission can be completed within the available time.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in machine-readable signal medium, such as an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
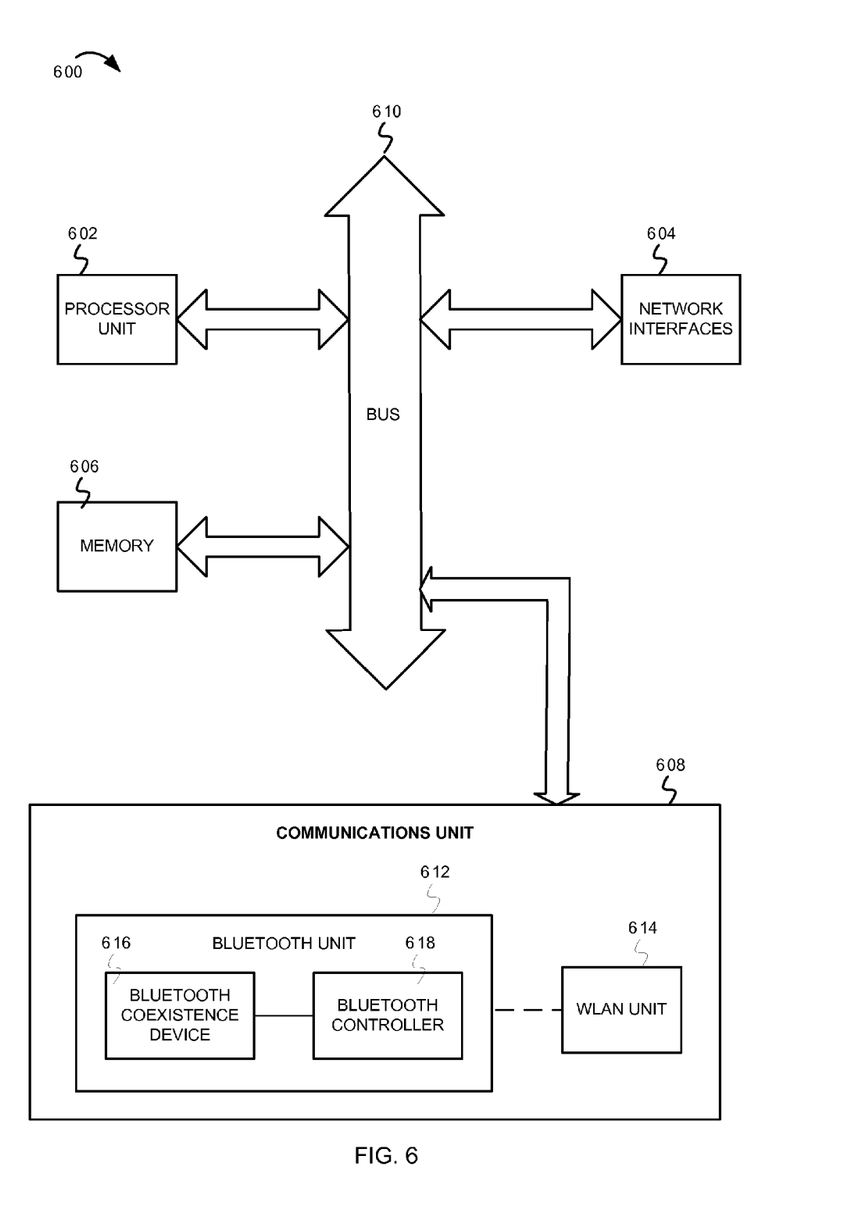
FIG. 6 is a block diagram of one embodiment of a computer system including a discovery mechanism for collocated Bluetooth and WLAN devices.

FIG. 6 is a block diagram of one embodiment of a computer system including a discovery mechanism for collocated Bluetooth and WLAN devices. In some implementations, the computer system 600 may be one of a personal computer (PC), a laptop, a netbook, a mobile phone, a personal digital assistant (PDA), a mobile gaming device, or other electronic systems comprising a collocated Bluetooth device and a WLAN device. The computer system 600 includes a processor device 602 (possibly including multiple processors, multiple cores, multiple nodes, and/or implementing multi-threading, etc.). The computer system 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 600 also includes a bus 610 (e.g., PCI, ISA, PCI-Express, HyperTransport, InfiniBand®, NuBus, etc.), and network interfaces 604 that include at least one wireless network interface (e.g., a WLAN interface, a Bluetooth® interface, a WiMAX interface, a ZigBee® interface, a Wireless USB interface, etc.).

The computer system 600 also includes a communications unit 608. The communications unit 608 comprises a Bluetooth device 612 and a WLAN device 614. The Bluetooth device comprises a Bluetooth coexistence device 616 coupled to a Bluetooth controller 618. In one implementation, the Bluetooth device 612 and the WLAN device 614 may be collocated on a single chip within the communications device 608. In another implementation, the Bluetooth device 612 and the WLAN device 614 may be embodied as separate chips. The Bluetooth device 612 and the WLAN device 614 can communicate with each other via physical connecting wires or via a software module running on the computer system 600. The Bluetooth device 612 and the WLAN device 614 operates in accordance with operations described with reference to FIGS. 1-5 to ensure that Bluetooth transmissions do not impair WLAN device 614 communications.

It should be noted that any one of the above-described functionalities might be partially (or entirely) implemented in hardware and/or on the processing unit 602. For example, the functionality may be implemented with an application specific integrated circuit, in logic implemented in the processing unit 602, in a co-processor on a peripheral device or card, etc. Further, realizations may include fewer or additional components not illustrated in FIG. 6 (e.g., additional network interfaces, peripheral devices, etc.). The processor unit 602 and the network interfaces 604 are coupled to the bus 610. Although illustrated as being coupled to the bus 610, the memory 606 may be coupled to the processor unit 602.

While the embodiments are described with reference to various implementations and exploitations, it will be understood that these embodiments are illustrative and that the scope of the inventive subject matter is not limited to them. In general, a discovery and connection coexistence mechanism for wireless devices as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving, at a first wireless network device of a first system, a first RF signal comprising an inquiry message from an inquiring wireless network device of a remote system;
   detecting that a second wireless network device of the first system is in an active state;
   determining a signal strength of the first RF signal comprising the inquiry message;
   determining a communication frequency associated with the first wireless network device, a communication frequency associated with the second wireless network device, and a communication frequency separation between the first wireless network device and the second wireless network device;
   determining, at the first wireless network device, a transmit power for transmitting a response to the inquiry message based, at least in part, on the communication frequency separation between the first wireless network device and the second wireless network device, and a signal strength of one or more RF signals received at the second wireless network device;
   comparing the transmit power associated with the response to the inquiry message to a minimum transmit power for transmitting the response to the inquiry message to the inquiring wireless network device, wherein the minimum transmit power is determined based, at least in part, on the signal strength of the first RF signal, wherein the minimum transmit power represents a minimum power at which the inquiring wireless network device can receive the response without impairments; and
   transmitting, to the inquiring wireless network device, the response to the inquiry message based, at least in part, on said comparing the transmit power associated with the response to the inquiry message to the minimum transmit power for transmitting the response to the inquiry message.

2. The method of claim, wherein the signal strength of the one or more RF signals received at the second wireless network device comprises one of an average signal strength calculated over a pre-determined number of RF signals received at the second wireless network device, an average signal strength calculated over the one or more RF signals received at the second wireless network device within a pre-determined time interval, and a minimum signal strength of a second pre-determined number of RF signals received at the second wireless network device.

3. The method of claim, wherein said comparing the transmit power associated with the response to the inquiry message to the minimum transmit power for transmitting the response to the inquiry message to the inquiring wireless network device comprises:
   determining whether the response to the inquiry message should be transmitted to the inquiring wireless network device in response to said comparing the transmit power associated with the response to the inquiry message to the minimum transmit power for transmitting the response to the inquiry message to the inquiring wireless network device;
   if it is determined that the response to the inquiry message should be transmitted, transmitting the response to the inquiry message to the inquiring wireless network device at the transmit power associated with the response to the inquiry message; and
   if it is determined that the response to the inquiry message should not be transmitted, preventing transmitting the response to the inquiry message to the inquiring wireless network device.

4. The method of claim 1, wherein said comparing the transmit power associated with the response to the minimum transmit power for transmitting the response to the inquiry message to the inquiring wireless network device comprises:
   determining whether the transmit power associated with the response to the inquiry message is greater than the minimum transmit power.

5. The method of claim 1, wherein said determining the transmit power for transmitting the response to the inquiry message further comprises accessing a look-up table comprising a plurality of transmit power values corresponding to combinations of the communication frequency separation between the first wireless network device and the second wireless network device and the signal strength of the one or more RF signals received at the second wireless network device.

6. The method of claim 1, further comprising:
   determining that the signal strength of the one or more RF signals received at the second wireless network device is less than a threshold signal level; and
   preventing transmitting the response to the inquiry message to the inquiring wireless network device.

7. The method of claim 1, further comprising determining the transmit power for transmitting the response to the inquiry message transmitted by the first wireless network device based, at least in part, on a requisite power separation between the signal strength of the first RF signal and the signal strength of the one or more RF signals received at the second wireless network device.

8. The method of claim 1, further comprising:
   determining that the second wireless network device is in an inactive state;
   transmitting, to the inquiring wireless network device, one of the response to the inquiry message and a second inquiry frame identifying the first wireless network device in an attempt to establish communication with the inquiring wireless network device.

9. The method of claim 1, further comprising determining that the first wireless network device is programmed to communicate with the inquiring wireless network device based on content of the inquiry message from the inquiring wireless network device of the remote system.

10. The method of claim 9, wherein the content of the inquiry message identifies the inquiring wireless network device and comprises at least one of a medium access control identifier, a network identifier, a timestamp indicating a date and time at which the inquiry message was created, a content timestamp indicating a date and time at which information to be transmitted was updated, applications running on the inquiring wireless network device, and network and device capabilities of the inquiring wireless network device.

11. The method of claim 1, wherein the first wireless network device is a Bluetooth device, and the second wireless network device is a wireless local area network (WLAN) device.

12. The method of claim 1, wherein the signal strength of the first RF signal is a received signal strength indicator (RSSI) of the first RF signal.

13. The method of claim 1, further comprising preventing transmitting the response to the inquiry message based on one of determining that the first wireless network device is not programmed to communicate with the inquiring wireless network device and information exchange between the first wireless network device and the inquiring wireless network device has been completed.

14. A Bluetooth device of a communication system comprising:
a Bluetooth controller configured to receive a first RF signal comprising an inquiry message from an inquiring Bluetooth device of a remote communication system; and
a coexistence unit configured to detect that a collocated WLAN device of the communication system is in an active state;
wherein the coexistence unit is further configured to:
  determine a signal strength of the first RF signal comprising the inquiry message;
  determine a communication frequency associated with the Bluetooth device, a communication frequency associated with the collocated WLAN device, and a communication frequency separation between the Bluetooth device and the collocated WLAN device;
  determine a transmit power for transmitting a response to the inquiry message based, at least in part, on the communication frequency separation between the Bluetooth device and the collocated WLAN device, and a signal strength of one or more RF signals received at the collocated WLAN device;
  compare the transmit power associated with the response to the inquiry message to a minimum transmit power for transmitting the response to the inquiry message to the inquiring Bluetooth device, wherein the minimum transmit power is determined based, at least in part, on the signal strength of the first RF signal, wherein the minimum transmit power represents a minimum power at which the inquiring Bluetooth device can receive the response without impairments; and
  direct the Bluetooth controller whether to transmit, to the inquiring Bluetooth device, the response to the inquiry message based, at least in part, on comparing the transmit power associated with the response to the inquiry message to the minimum transmit power for transmitting the response to the inquiry message.

15. The Bluetooth device of claim 14, wherein the signal strength of the one or more RF signals received at the WLAN device comprises one of an average signal strength calculated over a pre-determined number of RF signals received at the WLAN device, an average signal strength calculated over the one or more RF signals received at the WLAN device within a pre-determined time interval, and a minimum signal strength of a second pre-determined number of RF signals received at the WLAN device.

16. The Bluetooth device of claim 14, wherein the coexistence unit configured to compare the transmit power associated with the response to the inquiry message to a minimum transmit power for transmitting the response to the inquiry message to the inquiring Bluetooth device comprises the coexistence unit configured to:
  determine whether the response to the inquiry message should be transmitted to the inquiring Bluetooth device;
  direct the Bluetooth controller to transmit the response to the inquiry message to the inquiring Bluetooth device at the transmit power associated with the response to the inquiry message, if it is determined that the response to the inquiry message should be transmitted; and
  direct the Bluetooth controller to prevent transmitting the response to the inquiry message to the inquiring Bluetooth device, if it is determined that the response to the inquiry message should not be transmitted.

17. The Bluetooth device of claim 14, wherein the coexistence unit is configured to determine that the Bluetooth device is programmed to communicate with the inquiring Bluetooth device based on content of the inquiry message, and wherein the content of the inquiry message comprises at least one of a medium access control identifier, a network identifier, a timestamp indicating a date and time at which the inquiry message was created, a content timestamp indicating a date and time at which information to be transmitted was updated, applications running on the inquiring Bluetooth device, and network and device capabilities of the inquiring Bluetooth device.

18. The Bluetooth device of claim 14, wherein the communication system comprises one of a mobile phone, a laptop, a netbook, a personal digital assistant, a mobile gaming device, and a personal computer.

19. A communication system comprising:
a first wireless network device configured to receive a first RF signal comprising an inquiry message from an inquiring wireless network device of a first remote communication system; and
a second wireless network device configured to receive one or more RF signals from a second remote communication system;
wherein the first wireless network device is further configured to:
  detect that the second wireless network device is in an active state;
  determine that the first wireless network device is programmed to communicate with the inquiring wireless network device based on content of the inquiry message from the inquiring wireless network device of the first remote communication system;
  determine a signal strength of the first RF signal comprising the inquiry message;
  determine a communication frequency associated with the first wireless network device, a communication frequency associated with the second wireless network device, and a communication frequency separation between the first wireless network device and the second wireless network device; and
  determine a transmit power for transmitting a response to the inquiry message based, at least in part, on the communication frequency separation between the first wireless network device and the second wireless network device, and a signal strength of the one or more RF signals received at the second wireless network device;
  compare the transmit power associated with the response to the inquiry message to a minimum transmit power for transmitting the response to the inquiry message to the inquiring wireless network device, wherein the minimum transmit power is determined based, at least in part, on the signal strength of the first RF signal, wherein the minimum transmit power represents a minimum power at which the inquiring wireless network device can receive the response without impairments; and transmit, to the inquiring wireless network device of the first remote communication system, the response to the inquiry message based, at least in part, on comparing the transmit power associated with the response to the inquiry message to the minimum transmit power for transmitting the response to the inquiry message.

20. The communication system of claim 19, wherein the content of the inquiry message identifies the inquiring wireless network device and comprises at least one of a medium access control identifier, a network identifier, a timestamp indicating a date and time at which the inquiry message was created, a content timestamp indicating a date and time at which information to be transmitted was updated, applications running on the inquiring wireless network device, and network and device capabilities of the inquiring wireless network device.

21. The communication system of claim 19, wherein the signal strength of the one or more RF signals received at the second wireless network device comprises one of an average signal strength calculated over a pre-determined number of RF signals received at the second wireless network device, an average signal strength calculated over the one or more RF signals received at the second wireless network device within a pre-determined time interval, and a minimum signal strength of a second pre-determined number of RF signals received at the second wireless network device.

22. The communication system of claim 19, wherein the first wireless network device configured to compare the transmit power associated with the response to the inquiry message to the minimum transmit power for transmitting the response to the inquiry message to the inquiring wireless network device comprises the first wireless network device configured to:

determine whether the response to the inquiry message should be transmitted to the inquiring wireless network device based on comparing the transmit power associated with the response to the inquiry message to the minimum transmit power for transmitting the response to the inquiry message to the inquiring wireless network device;

transmit the response to the inquiry message to the inquiring wireless network device at the transmit power associated with the response to the inquiry message, if it is determined that the response to the inquiry message should be transmitted; and prevent transmitting the response to the inquiry message to the inquiring wireless network device, if it is determined that the response to the inquiry message should not be transmitted.

23. One or more non-transitory machine-readable storage media, having instructions stored therein, which when executed by one or more processors causes the one or more processors to perform operations that comprise:

receiving, at a Bluetooth device of a first communication system, a first RF signal comprising an inquiry message from an inquiring Bluetooth device of a remote communication system;

detecting that a collocated WLAN device of the first communication system is in an active state;

determining a signal strength of the first RF signal comprising the inquiry message;

determining a communication frequency associated with the Bluetooth device, a communication frequency associated with the collocated WLAN device, and a communication frequency separation between the Bluetooth device and the collocated WLAN device; and determining, at the Bluetooth device, a transmit power for transmitting a response to the inquiry message based, at least in part, on the communication frequency separation between the Bluetooth device and the collocated WLAN device, and a signal strength of one or more RF signals received at the collocated WLAN device;

comparing the transmit power associated with the response to the inquiry message to a minimum transmit power for transmitting the response to the inquiry message to the inquiring Bluetooth device, wherein the minimum transmit power is determined based, at least in part, on the signal strength of the first RF signal, wherein the minimum transmit power represents a minimum power at which the inquiring Bluetooth device can receive the response without impairments; and transmitting, to the inquiring Bluetooth device, the response to the inquiry message based, at least in part, on said comparing the transmit power associated with the response to the inquiry message to the minimum transmit power for transmitting the response to the inquiry message.

24. The one or more non-transitory machine-readable storage media of claim 23, wherein said operation of comparing the transmit power associated with the response to the inquiry message to the minimum transmit power for transmitting the response to the inquiry message to the inquiring Bluetooth device comprises:

determining whether the response to the inquiry message should be transmitted to the inquiring Bluetooth device in response to said comparing the transmit power associated with the response to the inquiry message to the minimum transmit power for transmitting the response to the inquiry message to the inquiring Bluetooth device;

if it is determined that the response to the inquiry message should be transmitted, transmitting the response to the inquiry message to the inquiring Bluetooth device at the transmit power associated with the response to the inquiry message;

and if it is determined that the response to the inquiry message should not be transmitted, preventing transmitting the response to the inquiry message to the inquiring Bluetooth device.

25. The one or more non-transitory machine-readable storage media of claim 23, wherein the operations further comprise determining that the Bluetooth device is programmed to communicate with the inquiring Bluetooth device based on content of the inquiry message from the inquiring Bluetooth device of the remote communication system, and wherein the content of the inquiry message comprises at least one of a medium access control identifier, a network identifier, a timestamp indicating a date and time at which the inquiry message was created, a content timestamp indicating a date and time at which information to be transmitted was updated, applications running on the inquiring Bluetooth device, and network and device capabilities of the inquiring Bluetooth device.

* * * * *